(12) United States Patent
Worrell

(10) Patent No.: US 6,690,425 B1
(45) Date of Patent: Feb. 10, 2004

(54) ASPECT RATIO CONTROL ARRANGEMENT IN A VIDEO DISPLAY

(75) Inventor: Charles William Worrell, Carmel, IN (US)

(73) Assignee: Thomson Licensing S.A., Boulogne, Cedex (FR)

(*) Notice: Subject to any disclaimer, the term of this patent is extended or adjusted under 35 U.S.C. 154(b) by 0 days.

(21) Appl. No.: 09/599,685

(22) Filed: Jun. 22, 2000

(51) Int. Cl.⁷ .......................... H04N 7/01; H04N 11/20; H04N 5/46
(52) U.S. Cl. ....................... 348/445; 348/556; 348/558
(58) Field of Search ................. 348/445, 555, 348/556, 558, 913, 747, 806; H04N 7/01, 11/20, 5/46

(56) References Cited

U.S. PATENT DOCUMENTS

| | | | |
|---|---|---|---|
| 4,953,025 A | 8/1990 | Saitoh et al. | 358/140 |
| 5,146,331 A | 9/1992 | Tsuchida | 358/169 |
| 5,253,060 A | 10/1993 | Welmer et al. | 358/140 |
| 5,323,235 A | 6/1994 | Tonomura et al. | 348/445 |
| 5,343,238 A | 8/1994 | Takata et al. | 348/556 |
| 5,384,600 A * | 1/1995 | Kaizaki et al. | 348/556 |
| 5,699,123 A * | 12/1997 | Ebihara et al. | 348/445 |
| 5,760,840 A | 6/1998 | Tani et al. | 348/558 |
| 5,784,123 A * | 7/1998 | Yoshimi | 348/556 |
| 5,805,234 A * | 9/1998 | Matsuura | 348/558 |
| 5,880,941 A * | 3/1999 | Yanagihara et al. | 386/1 |
| 5,917,549 A * | 6/1999 | Simons et al. | 348/441 |
| 5,929,926 A | 7/1999 | Kim | 348/556 |
| 5,949,494 A | 9/1999 | Yamagata et al. | 348/558 |
| 5,982,445 A * | 11/1999 | Eyer et al. | 348/461 |
| 5,999,223 A * | 12/1999 | Patel et al. | 348/555 |
| 6,226,046 B1 * | 5/2001 | Yamagata et al. | 348/558 |
| 6,229,574 B1 * | 5/2001 | Han | 348/555 |
| 6,275,267 B1 * | 8/2001 | Kobayashi | 348/555 |
| 6,310,655 B1 * | 10/2001 | Godwin | 348/445 |

* cited by examiner

Primary Examiner—John Miller
Assistant Examiner—Brian Yenke
(74) Attorney, Agent, or Firm—Joseph S. Tripoli; Joseph J. Lake; Sammy S. Henig

(57) ABSTRACT

A user selects a predefined aspect ratio format of an image displayed on a display screen. When a change in an aspect ratio format of an incoming signal occurs, that would, otherwise, produce a distorted image, a format controller automatically overrides the user's predefined aspect ratio for establishing a different image aspect ratio. Thereby, the distortion of the image is prevented.

10 Claims, 3 Drawing Sheets

ASPECT RATIO CONTROL ARRANGEMENT IN A VIDEO DISPLAY

BACKGROUND

The invention relates to an arrangement for controlling an aspect ratio of a video display.

BRIEF DESCRIPTION

Video sources such as digital versatile disk (DVD), high definition television (HDTV), standard television, and the like, can supply a video signal having an aspect ratio format (source aspect ratio) selected from a range of formats. For example, a 4:3 aspect ratio format and a 16:9 aspect ratio format are supported in consumer products. In modern televisions, the display screen dimensions may be have either a 4:3 or a 16:9 aspect ratio (physical aspect ratio). The viewer may choose to view an image produced from the incoming video signal having dimensions defining an image aspect ratio format that is better adapted to fit the physical aspect ratio of the display screen.

Many consumer electronics devices will allow a user to select the display of source material in an image aspect ratio format that differs from the physical aspect ratio of the display screen. However, such selection, disadvantageously, allows the user to change the aspect ratio in a manner to produce a distorted image.

For example, a consumer may be watching a movie that has a 16:9 source aspect ratio as shown in FIG. 1. Reference 100 represents the image content of a video source material having a 16:9 source aspect ratio. If, as shown in FIG. 2, the user has a 4:3, equal to b/a, physical aspect ratio display device, the user may decide to watch the video in letterbox format to fit the 16:9 program onto the 4:3 display. As such, the top and bottom of the screen are cropped (regions 202, 204) to enable the 16:9 source aspect ratio programming to be shown on the 4:3 physical aspect ratio display device. The resulting image aspect ratio format is 16:9. This provides an acceptable image until the incoming signal changes, perhaps as a result of switching to a commercial that has a 4:3 source aspect ratio, or of changing channels to a source program with a 4:3 source aspect ratio, as shown in FIG. 3. As shown in FIG. 4, the 4:3 source aspect ratio programming is distorted when displayed on a display device having a physical aspect ratio 4:3 that is set to display a 16:9 source aspect ratio program in an image having a 16:9 (d/c) image aspect ratio format.

Some televisions have circuitry that automatically adjusts the aspect ratio that is displayed to match the aspect ratio of the received signal. Such automatic circuits are disclosed in U.S. Pat. Nos. 5,949,494; 5,146,331; 5,323,235; and 5,343,238. However, these aspect ratio control circuits, disadvantageously, do not enable the user to control the aspect ratio that is displayed.

In carrying an inventive feature, a user can select an aspect ratio for the image according to the user preference. However, when a change in the aspect ratio of the source material is detected that could result in a distortion, the image aspect ratio format is automatically changed to insure that an undistorted picture is generated. Thereby, the arrangement automatically overrides the user's selection, for example, only when necessary to avoid a distorted picture.

SUMMARY OF THE INVENTION

A video display apparatus, embodying an inventive feature includes a source of a video, first signal. A detector is provided for generating a second signal identifying an aspect ratio format of the video signal. A source of a control, third signal indicative of a preferred, first image aspect ratio format is provided. A display controller is responsive to the first, second and third signals for producing, on a display screen, an image having the first image aspect ratio format, selected in accodance with the third signal, when the video signal has a first video signal format. The display controller changes automatically the first image aspect ratio of the image to a different image aspect ratio format, in accordance with the second signal, in a manner to override the first signal, when a format of the video signal changes to a second video signal format.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
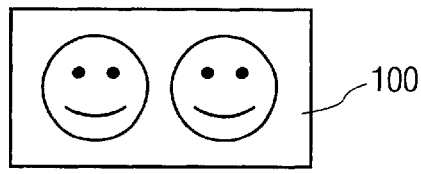
FIG. 1 depicts a source image having a 16:9 aspect ratio.
Figure 2:
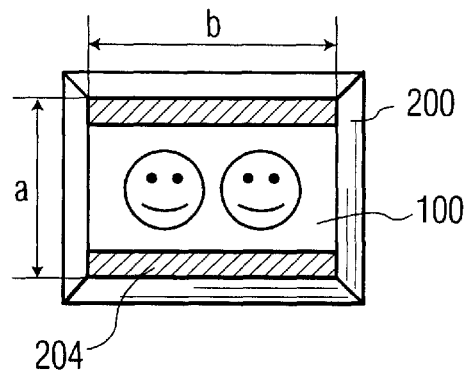
FIG. 2 depicts the source image of FIG. 1 displayed on a 4:3 physical aspect ratio display device.
Figure 3:
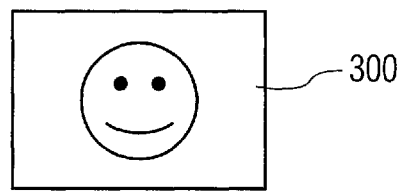
FIG. 3 depicts a source image having a 4:3 source aspect ratio.
Figure 4:
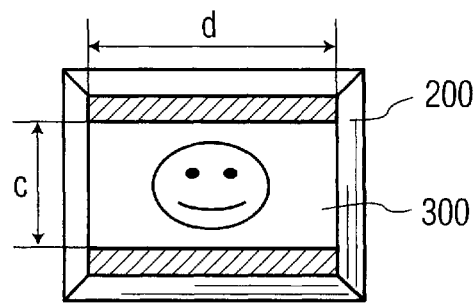
FIG. 4 depicts a 4:3 physical aspect ratio display device of FIG. 2 displaying in a distorted manner the source image of FIG. 3 having a video aspect ratio format of 4:3 in an image aspect ratio of 16:9.
Figure 5:
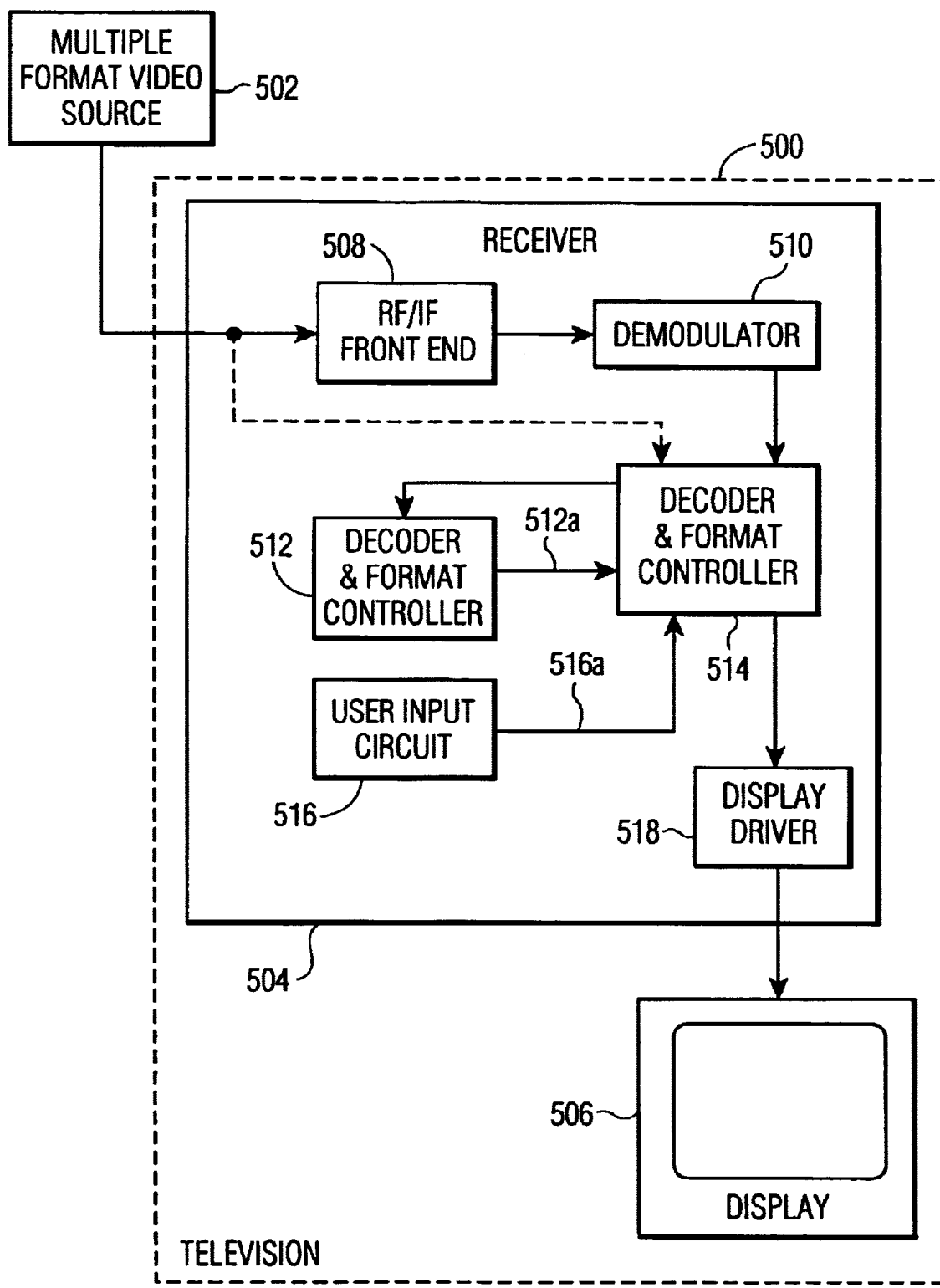
FIG. 5 depicts a television containing the present invention.

FIG. 5 depicts the television 500 capable of receiving multiple format video material or content from a multiple format video source 502. The multiple format video source 502 is illustratively one or more source devices including, but not limited to, a DVD player, a set top box, a source of high definition television signals, a cable television source, an off-the-air television source, and the like. The video source 502 provides the television 500 with source material having various video signal aspect ratio formats including 4:3 aspect ratio format and 16:9 aspect ratio format.

The television 500 comprises a receiver 504 and a display screen 506. The receiver 504 comprises a RF/IF front end 508, a demodulator 510, a decoder and format controller 514, a format detector 512, a user input circuit 516, and a display driver 518. A display 506 has a physical aspect ratio of, for example, 4:3.

The RF/IF front end 508 and the demodulator 510 are circuits that are well known in the art for receiving, tuning, and demodulating various aspect formats of video signals. In some instances, depending on the video source that is supplying the video signal, the front end 508 and the demodulator 510 may be bypassed to supply the video source signal directly to decoder and format controller 514. This occurs when a source material is a digital video source material such as a DVD signal. The decoder and format controller 514 decodes the digital video source material and selects the image aspect ratio format of the displayed image for display on display screen 506, in accordance with a user selected image aspect ratio.

The image aspect ratio format is established by the user input circuit 516. The user or viewer, through manipulation of a remote control, can select the preferred image aspect ratio format for displaying the video program. This selection can be performed regardless of the aspect ratio of the source material. As such, if the viewer is about to view a video source having a 16:9 source aspect ratio format, the user can send a command or a control signal 516*a* to decoder and format controller 514 to set the image aspect ratio format for the display at 16:9 in a conventional manner.

Figure 6:
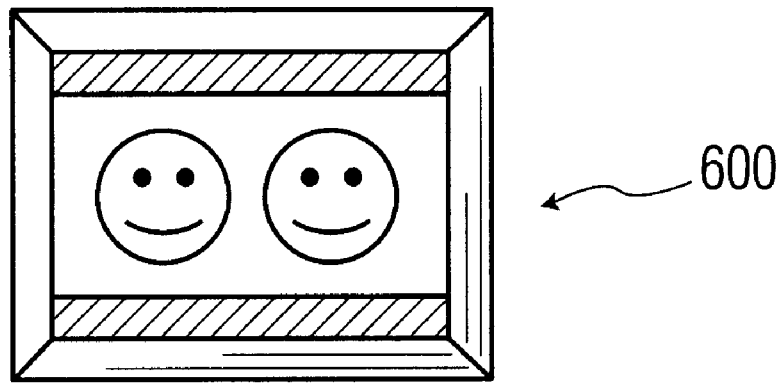
FIG. 6 depicts the display device of FIG. 5 displaying a 16:9 aspect ratio of source material in a 16:9 image aspect ratio format on a 4:3 physical aspect ratio display device.

For a display device having a 4:3 physical aspect ratio, the display driver 518 would display the 16:9 source aspect ratio in a letterbox format such that bands of black screen (cropping) appear at the top and bottom of the displayed video. Such a display 600 is shown in FIG. 6.

The format detector 512 is coupled to the decoder and format controller 514 and produces an output signal 512*a*. Format detector 512 detects a change in the source aspect ratio of the incoming video source signal.

In carrying out an inventive feature, when a change in the video signal aspect ratio format would tend to produce a distortion in the image, the user's selected aspect ratio format for the image will be automatically overridden to provide a suitable different image aspect ratio format. Thereby, the displayed image will display the picture information of the incoming source material in an undistorted manner.

For digital source material, the format detector 512 can monitor the bitstream information that contains an indicator of the source aspect ratio for the material embedded in the bitstream. For analog source material, the format detector 512 can monitor the chrominance signal for a DC offset that can exist when there is a 16:9 aspect ratio signal being received. Automatic letterbox detectors are also known that examine luminance data. A 4:3 aspect ratio signal does not generate a DC offset in the chrominance signal. As such, for either a digital video source or an analog video source, the format detector 512 can detect the appropriate image aspect ratio format for displaying the source material.

Figure 7:
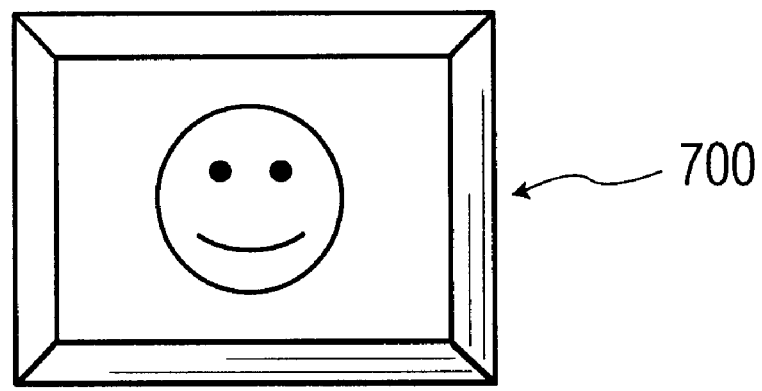
FIG. 7 depicts the display device of FIG. 5 displaying a 4:3 aspect ratio source material on a 4:3 physical aspect ratio display device.

FIG. 6 depicts a 16:9 aspect ratio video source signal being displayed on display 506, a 4:3 aspect ratio display. When source material arrives, that has a 4:3 source aspect ratio, the format detector 512 detects the aspect ratio format of the received video signal and overrides the user's command for a 16:9 image aspect ratio format. As such, and as shown in FIG. 7, the 4:3 aspect ratio source material is displayed on the 4:3 aspect ratio display 700 in an undistorted manner. When the video source signal becomes a 16:9 aspect ratio source again, the format detector will switch the format controller 514 back to the letterbox format of FIG. 6 that was selected by the user. In this manner, when commercials and other video streams that arrive due to changes in signal or changes in channel, the television receiver automatically adjusts the image aspect ratio format to insure that an undistorted image is decoded and displayed. It should be understood that the aspect ratios for which the invention is applicable are not limited the 4:3 and 16:9 aspect ratios, mentioned herein.

What is claimed is:

1. An apparatus for controlling an aspect ratio of a displayed image, comprising:
    a format controller for establishing an image aspect ratio for said displayed image in accordance with a user command designating said image aspect ratio; and
    a format detector for detecting a change in the aspect ratio of said displayed image, said format controller being responsive to said format detector to automatically override said user established image aspect ratio and select a different aspect ratio expected to prevent distortion of said displayed image after said change ratio.

2. The apparatus of claim 1, wherein the format detector detects a signal within a digital bitstream.

3. The apparatus of claim 1, wherein the format detector detects a DC offset in a chrominance signal.

4. The apparatus of claim 1, wherein said format detector comprises an automatic letterbox detector.

5. A video display apparatus, comprising:
    source of a video, first signal;
    a detector for generating a second signal identifying an aspect ratio of said video signal;
    a source. of a control, third signal indicative of a preferred, first image aspect ratio;
    a display controller responsive to said first, second and third signals for producing, on a display screen, an image having said first image aspect ratio, selected in accordance with said third signal, when said video signal has a fist video signal format, said display controller changing automatically said first image aspect ratio of said image to a different image aspect ratio, in accordance with said second signal, in a manner to override said first signal, when a format of said video signal changes to a second video signal format.

6. The apparatus of claim 1, wherein said format controller detects another change in the aspect ratio format and automatically returns to said user established image aspect ratio format.

7. An apparatus for controlling an aspect ratio of a displayed image, comprising:
    a format controller for establishing an image aspect ratio for said displayed image in accordance with a user command designating said image aspect ratio; and
    a format detector for detecting a change in the aspect ratio of said displayed image, said format controller being responsive to said format detector to automatically override said user established image aspect ratio and select a different aspect ratio expected to prevent distortion of said displayed image after said change ratio and upon sensing another change in the aspect ratio automatically returning to said user established image aspect ratio.

8. The apparatus of claim 7, wherein the format detector detects a signal within a digital bitstream.

9. The apparatus of claim 7, wherein the format detector detects a DC offset in a chrominance signal.

10. The apparatus of claim 7, wherein the format detector comprises an automatic letterbox detector.

* * * * *